US009721448B2

(12) United States Patent
Wu et al.

(10) Patent No.: US 9,721,448 B2
(45) Date of Patent: Aug. 1, 2017

(54) WIRELESS COMMUNICATION SYSTEMS FOR UNDERGROUND PIPE INSPECTION

(71) Applicant: Massachusetts Institute of Technology, Cambridge, MA (US)

(72) Inventors: Dalei Wu, Cambridge, MA (US); Kamal Youcef-Toumi, Cambridge, MA (US); Samir Mekid, Dharhan (SA); Rached Ben-Mansour, Dhahran (SA)

(73) Assignees: Massachusetts Institute of Technology, Cambridge, MA (US); King Fahd University of Petroleum and Minerals, Dhahran (SA)

( * ) Notice: Subject to any disclaimer, the term of this patent is extended or adjusted under 35 U.S.C. 154(b) by 305 days.

(21) Appl. No.: 14/569,889

(22) Filed: Dec. 15, 2014

(65) Prior Publication Data
US 2015/0179044 A1 Jun. 25, 2015

Related U.S. Application Data

(60) Provisional application No. 61/918,791, filed on Dec. 20, 2013.

(51) Int. Cl.
*G08C 17/00* (2006.01)
*G08B 21/20* (2006.01)
(Continued)

(52) U.S. Cl.
CPC .............. *G08B 21/20* (2013.01); *G01M 3/18* (2013.01); *G01M 3/243* (2013.01); *H04W 36/18* (2013.01);
(Continued)

(58) Field of Classification Search
CPC . H04W 36/18; H04W 52/0203; H04W 84/12; Y02B 60/50; G08B 21/20; G01M 3/18; G01M 3/243
(Continued)

(56) References Cited

U.S. PATENT DOCUMENTS

2009/0013806 A1* 1/2009 Miller .................... F16L 55/48
73/865.8
2009/0059827 A1* 3/2009 Liu ...................... H04W 76/048
370/311
(Continued)

OTHER PUBLICATIONS

Stoianov et al.,, "PIPENET: A Wireless Sensor Network for Pipeline Monitoring." IPSN '07, Apr. 25-27, 2007. Cambridge, Massachusetts, U.S.A.
(Continued)

*Primary Examiner* — Peter Cheng
(74) *Attorney, Agent, or Firm* — Sam Pasternack; MIT Technology Licensing Office

(57) ABSTRACT

Wireless communication system for underground pipeline inspection. The system includes a plurality of sensor nodes moved by robots within the pipeline and each sensor node includes a radio transceiver. A plurality of spaced apart, above ground relay nodes are deployed along the pipeline, each relay node including a radio transceiver for communication with the sensor nodes. A remote monitoring center is provided in communication with the relay nodes, whereby a leak detected by a sensor node is communicated to the remote monitoring center. Each sensor node may further include a microcontroller, an accelerometer and a timer.

15 Claims, 1 Drawing Sheet

(51) Int. Cl.
  *H04W 36/18* (2009.01)
  *H04W 52/02* (2009.01)
  *G01M 3/18* (2006.01)
  *G01M 3/24* (2006.01)
  *H04W 84/12* (2009.01)

(52) U.S. Cl.
  CPC ........ *H04W 52/0203* (2013.01); *H04W 84/12* (2013.01); *Y02B 60/50* (2013.01)

(58) Field of Classification Search
  USPC ........................................................ 370/311
  See application file for complete search history.

(56) References Cited

U.S. PATENT DOCUMENTS

2009/0122781 A1* 5/2009 Voglewede ........... H04J 3/0667
  370/350
  2011/0298610 A1* 12/2011 Etkin ................ H04L 29/08792
  340/539.3
  2012/0155301 A1* 6/2012 Miyazaki ............ H04L 12/2602
  370/252
  2014/0052832 A1* 2/2014 Dina .................... B23K 9/1087
  709/221

OTHER PUBLICATIONS

Lin et al., "Wireless Sensor Network: Water Distribution Monitoring System," 7th IEEE Radio & Wireless Symposium, Jan. 2008.
  Sun et al., "MISE-PIPE: Magnetic induction-based wireless sensor networks for underground pipeline monitoring," Ad Hoc Networks, 2011, 218-227, 9, Elsevier, The Netherlands.
  Jawhar et al., "A Framework for Pipelineinfrastructure Monitoring using Wireless Sensor Networks," In Wireless Telecommunications Symposium 2007, 2007, 1-7, IEEE, US.

* cited by examiner

WIRELESS COMMUNICATION SYSTEMS FOR UNDERGROUND PIPE INSPECTION

This application claims priority to U.S. Provisional Application Ser. No. 61/918,791 filed on Dec. 20, 2013, the contents of which are incorporated herein by reference.

BACKGROUND OF THE INVENTION

This invention relates to pipeline leakage detection and more particularly to a wireless communication system for transmitting leakage information to a remote location.

Water leakage can reach 30% on average of the water transported across the water distribution networks [1, 2]. Many different techniques have been developed to detect leaks, either from the inside [3, 4] or from the outside of pipes [5]. Studies [3] have shown that compared with outside-of-the-pipe inspection, in-pipe inspection is much more accurate. In-pipe inspections are less sensitive to random events and external noise as well as less subjective to the operator's experience.

Communication functions are extremely important for an in-pipe inspection system to provide effective leak detection. For accurate and real-time leak detection, the sensed information needs to be reliably and timely transmitted to a remote monitoring center. On the other hand, in-pipe sensor nodes may need to be remotely controlled by the remote monitoring center, and accurate and timely delivery of control commands from the remote monitoring center to the in-pipe sensor nodes also poses a high requirement on the communication system.

There are several critical challenges on the development of a communication system for in-pipe inspection. First, traditional wired communication systems [6] do not work well. Wired systems have several drawbacks, such as limited scanning range, limited sensor mobility, and system failure due to wire damage. Second, for wireless communication systems, signals need to travel through different media, including water, plastic, soil, and air, to reach aboveground. Third, the battery-based energy supply of the in-pipe sensor nodes is limited. Finally, the motion of the in-pipe sensor nodes results in dynamic communication links and network connectivity.

In recent years some systems have been developed to provide wireless data communications for pipeline impaction or underground infrastructure monitoring. Different technologies have been explored to enable wireless communication, such as radio communications, acoustic communications, magnetic induction, elastodynamic waves, etc.

Some works adopt radio communications to enable information transmission for in-pipe inspection. Published application number 2005/0145018 describes a method for remote monitoring of a gas pipeline using wireless sensor networks. Wireless motes and nodes are deployed to some identified locations in the pipeline by a robot. Data from sensors are transmitted to some access points by using radio communications. Wireless transmitters operate inside the pipe such that the metal pipe acts as waveguide for the electromagnetic radiation. However this wireless communication method may not work well with water pipelines due to the high attenuation of radio waves in water. Also, the work is not focused on underground scenarios. U.S. Pat. No. 7,607,351 discloses a pipeline monitoring system with sensors placed along the pipeline. Each sensor station is equipped with a satellite modem and satellite antenna to provide near real time bidirectional communications between the sensor station and the remote monitoring center. However, sensors are affixed to the outside of the pipeline, making it difficult to detect small leaks or damage to the pipeline. There have been some research works on in-pipe inspection systems using radio communications [4]. However sensors in those systems are deployed at some fixed check points inside the pipe, which is unfeasible for performing sensing very close to a leak.

Some works developed wireless communication systems in the pipelines using acoustic waves. U.S. Pat. No. 7,423,931 discloses an acoustic system for communications in pipelines. A transmitter located in the pipeline communicates with a receiver by emitting acoustic signal bursts using the pipeline as a wave-guide or channel. To provide high data rate transmission, a frequency range of 3-100 kHz is adopted. However, the designers make no explanation of how to transmit the information from an underground pipeline to aboveground devices. The authors in [9] also use an acoustic wave to transmit sensing data in the pipe. However, two of the major challenges associated with acoustic communication systems are limited transmission bandwidth and high power consumption. These drawbacks make acoustic communication systems unsuitable for monitoring long pipelines with different pipe geometries.

Some works focus on magnetic induction based wireless communication systems for underground or underwater applications. U.S. Pat. No. 7,831,205 discloses a network of magnetic induction units that is configured to transmit a signal to or receive a signal from neighboring units by modulation of a time-varying magnetic field. Underground or underwater monitoring applications are suggested with the sensed data relayed in a multi-hop fashion. Some researchers have also proposed magnetic induction (MI)-based communications to wirelessly transmit data with the use of coils of wire wound on the pipelines [10]. However, in view of the short range of communications between two neighboring magnetic induction units or coils, it is impossible to perform large-scale deployment of such units or coils on long underground pipelines.

Some works adopt elastodynamic waves to enable wireless communications. U.S. Pat. No. 7,602,668 describes down hole sensor networks using wireless communications. The communication link between a sensor and a hub in the wellbore is formed by using elastodynamic waves. However, this wireless communication method is unsuitable for in-pipe inspection systems due to deployment challenges.

Thus, there is a need for a wireless communication system for underground in-pipe monitoring with mobile sensor nodes. Once such a system is in place, then pipelines can be monitored with a long-range and long-time operation in an accurate and real-time way.

SUMMARY OF THE INVENTION

The present invention provides a wireless communication system for underground pipeline inspection. Sensor nodes inside the pipeline are mobile and carried by robots. The wireless communication system disclosed herein includes mobile sensor nodes inside the underground pipeline, aboveground relay nodes deployed along the pipeline, a remote monitoring center, and a mobile communication network from a third-party provider.

The present invention provides a system and methods to enable bidirectional wireless communications between the underground in-pipe sensor nodes and the aboveground remote control center. In one direction, the sensed information can be transmitted from the sensor nodes to the remote control center. In the other direction, control commands can be delivered from the control center to the robots and/or the sensor nodes. The methods include both the operation steps for establishing communications between the underground in-pipe sensor nodes and the aboveground relay nodes, and the operation steps for establishing communications between the relay nodes and the remoter monitoring center.

Wireless sensor networks are energy-constrained, especially with underground in-pipe sensor nodes powered by batteries. The present invention also provides methods and communication protocols to enable energy-efficient communications and prolong the network lifetime.

In one aspect, the wireless communication system for underground pipeline inspection includes a plurality of sensor nodes moved by robots within the pipeline, each sensor node including a radio transceiver. A plurality of spaced apart, above ground relay nodes are deployed along the pipeline, each relay node including a radio transceiver for communication with the sensor nodes. A remote monitoring center is provided in communication with the relay nodes whereby a leak detected by a sensor node is communicated to the remote monitoring center. In a preferred embodiment, each sensor node further includes a microcontroller, an accelerometer and a timer. It is also preferred that the remote monitoring center be in communication with the plurality of relay nodes through a mobile communications network.

DESCRIPTION OF THE PREFERRED EMBODIMENT

Figure 1:
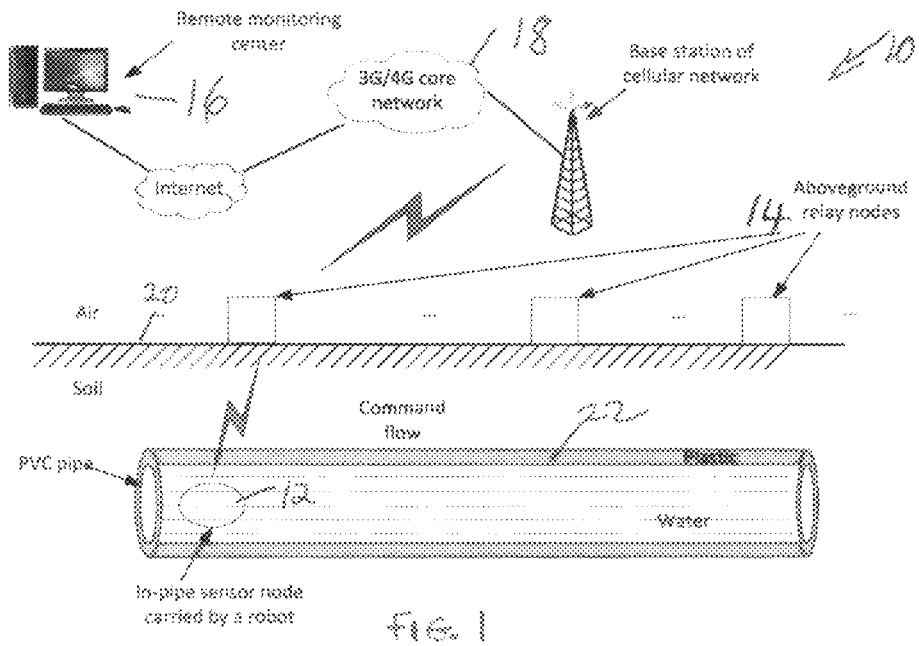
FIG. 1 is a schematic diagram of the disclosed wireless communication system for underground in-pipe inspection.

The present invention provides a wireless communication system for underground in-pipe inspection. As shown in FIG. 1, a wireless communication system 10 for underground pipeline inspection comprises mobile in-pipe sensor node 12, aboveground relay nodes 14, a remote monitoring center 16, and a mobile communication network 18 from a third-party service provider.

Each sensor node 12 is carried by a robot, and can move back and forth inside the pipeline. Each sensor node 12 is equipped with different types of sensors, such as acoustic or pressure sensors to detect a leak. Each sensor node 12 may include a microcontroller for robot control and data processing. Each sensor node 12 also may include a low-frequency radio transceiver for communication with the relay nodes. Additionally, each sensor node preferably also includes an accelerometer and a timer to help localize the position of the sensor node.

The relay nodes 14 are deployed on the soil surface 20 along the pipeline 22. Each relay node 14 is equipped with a low-frequency radio transceiver for communications with the sensor nodes 12. Each relay node 14 also has a modem/transceiver to communicate with the mobile communication network 18 from a third-party service provider. For example, if the mobile communication network is a cellular network, each relay node 14 may be equipped with a General Packet Radio Service (GPRS) modem, or an Enhanced GPRS (EGPRS) modem, or a High-Speed Packet Access (HSPA)/Long Term Evolution (LTE) modem, depending on the cellular network technology and the data rate requirement. With such a modem, a relay node 14 first communicates data from the sensor nodes 12 to the base station (BS) of the cellular network. Then the core network of the cellular network can send the data to the remote monitoring center 16 through the Internet. In the other direction, the control commands from the remote monitoring center 16 can be first delivered to the relay nodes 14 via the Internet and cellular network, and then reaches to the on-board controller of a sensor node 12 or robot. In the case where a cellular network is not available, other types of wireless communication networks can also be adopted, such as a WiFi network, WiMAX network, and satellite network, to establish aboveground communications between the relay nodes 14 and the remote monitoring center 16. For any such type of network, a corresponding modem/transceiver can be installed at the relay nodes.

The present invention provides a preferred radio frequency range of 50-900 MHz for the underground wireless communications. In view of the high attenuation of radio waves in soil and water, the radio frequency used for the communications between the underground sensors nodes 12 and the aboveground relay nodes 14 is much lower than that used in the aboveground mobile network 18. Depending on the desired tradeoff between signal attenuation and transmission rate, the radio frequency range used for underground communications in this invention can be 50-900 MHz.

Figure 2:
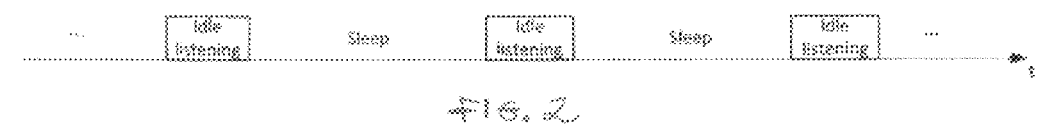
FIG. 2 is a schematic illustration showing a low-duty-cycle mode for the relay nodes according to the invention.
Figure 3:
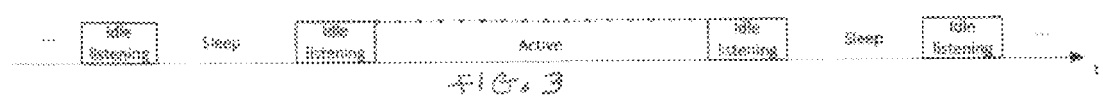
FIG. 3 is a schematic illustration showing that a relay node first switches from a low-duty-cycle mode to an active state when a sensor node enters its communication range and then switches back to the low-duty-cycle mode when the sensor node moves out of its communication range.

The present invention provides a method to save the relay nodes' 14 energy. Each in-pipe sensor node 12 switches its communications with different aboveground relay nodes as it moves in the underground pipe 22. In other words, the sensor node and the communicating/active relay node form a temporary cluster. The relay node 14 acts as the cluster head, and the sensor node 12 is the cluster member. To save the relay node's energy, the relay node operates in an active state only when it is communicating with a sensor node. If the relay node is not communicating with a sensor node, it operates in a low-duty-cycle mode. As shown in FIG. 2, the low-duty-cycle mode periodically puts those relay nodes 14 into sleep state, thereby reducing the idle listening time. In the sleep state, the radio is completely turned off. As shown in FIG. 3, if a sensor node 12 passes by a relay node 14, the relay node 14 will first switch from the low-duty-cycle mode to the active state when a sensor node 12 enters it communication range, and then switches back to the low-duty-cycle mode when the sensor node moves out of its communication range.

Figure 4:
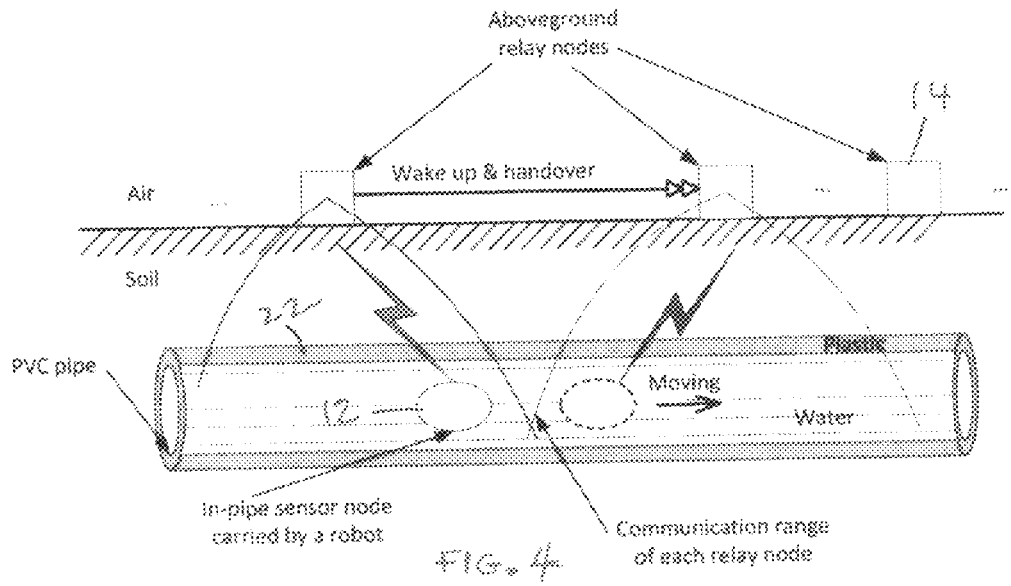
FIG. 4 is a schematic illustration showing that a relay node wakes its neighboring relay node and initiates a seamless handover when detecting that a covered sensor node is moving out of its communication range.

The present invention provides a method for a relay node 14 to wake its neighboring relay node up and initiate a seamless handover when detecting that the covered sensor node is going to move out of its communication range, as shown in FIG. 4. The relay node periodically evaluates the Received Signal Strength Indicator (RSSI) values of the incoming data packets from the sensor node. If a relay node 14 realizes that the RSSI values decrease to a threshold, or that the distance between the sensor node and the relay node derived from the RSSI values exceeds a threshold, the relay node will begin to send wake-up messages to the neighboring relay node in the direction of the sensor node movement.

Once the neighboring relay node wakes up, it will stay in the active state. Then the current relay node initiates a seamless handover by sending messages to the neighboring relay node. Once the handover succeeds and the communications between the sensor node and the neighboring relay node is established, the current relay node will go back to the low-duty-cycle mode.

The present invention provides a method for a sensor node to initiate the handover process. The sensor node 12 evaluates the Received Signal Strength Indicator (RSSI) values of the incoming beacon packets or control packets from a relay node 14. If the sensor node realizes that the RSSI values decrease to a threshold, or that the distance between the sensor node and the relay node derived from the RSSI values exceeds a threshold, the sensor node embeds a handover request in the outgoing data packets. Once the relay node receives the request, it will send back handover replies and begin the handover process with its neighboring relay node. Compared with the handover initialization by a sensor node, one of the advantages of handover initialization by a relay node is the reduced handover overhead on the sensor node, thereby saving the sensor node's energy.

The present invention provides a method for the communication system to handle high-speed moving sensor nodes 12. The moving speed of a sensor node places a bound on how rapidly the network 18 must react. If the sensor node moves at a fast speed, the current relay node may need to wake the neighboring node up in advance so that the current relay node can have enough time to perform the handover. In other words, the high mobility of the sensor node requires that neighboring relay nodes should remain awake or active earlier. One way is to allow the current relay node to wake its neighboring relay node up as soon as the sensor node enters the communication range of the current relay node. In addition, the moving speed of a sensor node also imposes requirement on the duty cycle configurations of the relay nodes. Depending on the sensor node's moving speed, the relay nodes may have multiple duty cycle configurations. Based on the specific application scenario, the remote monitoring center can send a new configuration of the duty cycle to the relay nodes via the mobile network. Alternatively, onboard duty cycle selection can also be performed in the relay nodes.

The present invention also provides a method for an active relay node to decide a sensor node's global position and movement direction. First, each relay node knows its global position by a GPS receiver installed in the relay node. Second, the relay node determines the geographic or pipelines distance between the sensor node and the relay node by evaluating the RSSI values of incoming data packets from the sensor node. Each sensor node is equipped with an accelerometer and a timer. The head field of the data packets from the sensor node contains the outputs of the accelerometer and the timer. Based on the received accelerometer output the relay node can decide the sensor node's moving direction. By combining the RSSI values, the last handover record, and the outputs of the accelerometer and the timer, the current relay node can obtain more accurate location of the sensor node relative to the relay node, including which side of the relay node the sensor node is on. With its global position and the sensor node's distance relative to the relay node, the relay node derives the global location of the sensor node.

The present invention provides a method for a sensor node to determine its global position. An active relay node acts as an anchor or beacon, and periodically sends it global position to the sensor node. The sensor node determines its geographic information or pipeline distance relative to the relay node by evaluating the RSSI values of the incoming beach packets from the relay node. By combining the analysis of RSSI values with the outputs of its accelerometer and timer, the sensor node obtains its more accurate position relative to the relay node. By combing this relative position with the received global position of the relay node, the sensor node determines its global position.

The present invention also provides steps to reliably and timely deliver leak detection information from a sensor node to the remote monitoring center. All sensed data are continuously stored on board and can be sent to the remote monitoring center when necessary. The sensor node performs real-time onboard data processing and extracts useful information, such as the leak detection results, leak size, and leak location. Once the information is available, the sensor node packetizes the information with error detection and correction fields, sends out the resulting packets, and waits for ACKs from the relay nodes. If the sensor node fails to receive the ACKs, it will retransmit the packets immediately. When there is no established communication link between the sensor node and any relay node, for example, the sensor node is out of the communication range of any relay node, the information is buffered in the memory of the sensor node. Whenever a communication link becomes available, the sensor node sends out the information immediately.

The present invention offers a method for time synchronization between an in-pipe sensor node and a relay node. The relay node obtains a timestamp from the installed GPS receiver. Each relay node periodically transmits a time beacon to inform the in-pipe sensor node of the timestamp.

It is to be understood that the present invention is not limited to the embodiment described above, but encompasses any and all embodiments within the scope of the following claims.

The numbers in square brackets refer to the references listed herein. The contents of all of these are incorporated herein by reference.

REFERENCES

[1] IDA, International Desalination Association, Inventory report, 2001.
[2] IRIN, News website, WWW.osisoft.com, October 2007.
[3] D. Chatzigeorgiou, K. Youcef-Toumi, A. Khalifa, and R. Ben-Mansour, "Analysis and Design of an In-Pipe System for Water Leak Detection," in Proc. ASME International Design Engineering Technical Conferences & Design Automation Conference, 2011.
[4] Ivan Stoianov, Lama Nachman, Sam Madden, and TimurTokmouline, "PIPENET: A Wireless Sensor Network for Pipeline Monitoring," IPSN'07, Apr. 25-27, 2007, Cambridge, Mass., U.S.A.
[5] Min Lin, Yan Wu, Ian Wassell, "Wireless Sensor Network: Water Distribution Monitoring System," 7th IEEE Radio & Wireless Symposium, January 2008
[6] Sahara system: http:/www.puretechltd.com/products/sahara/sahara_leak_gas_pocket.shtml
[9] George Kokossalalus, Acoustic Data Communication System for In-pipe Wireless Sensor Networks, Ph.D. Thesis, 2006.
[10] Zhi Sun, Pu Wang, Mehmet C. Vuran, Mznah A. Al-Rodhaan, Abdullah M. Al-Dhelaan, Ian F. Akyildiz, "MISE-PIPE: Magnetic induction-based wireless sensor networks for underground pipeline monitoring," Ad Hoc Networks 9 (2011) 218-227.

[11] I. Jawhar, N. Mohamed, K. Shuaib, "A Framework for PipelineInfrastructure Monitoring using Wireless Sensor Networks," in Wireless Telecommunications Symposium 2007, Pomona, Calif., USA, April 2007.

What is claimed is:

1. Wireless communication system for underground pipeline inspection comprising:
    a plurality of sensor nodes moved by robots within the pipeline, each sensor node including a sensor node radio transceiver;
    a plurality of spaced apart, above ground relay nodes deployed along the pipeline, each relay node including a relay node radio transceiver having a communications range for communication with the sensor nodes wherein each relay node switches from a low duty cycle mode to an active state when a sensor node enters the communications range of said each relay node and then switches back to the low duty cycle mode when the sensor node moves out of the communications range of said each relay node; and
    a remote monitoring center in communication with the relay nodes, for receiving information of a leak detected by a sensor node.

2. The system of claim 1 wherein each sensor node further includes a microcontroller, an accelerometer and a timer.

3. The system of claim 1 wherein the remote monitoring center is in communication with the plurality of relay nodes through a mobile communications network.

4. The system of claim 1 wherein the mobile in-pipe sensor nodes detect the leak through acoustic or pressure effects, conduct on-board signal processing, and send the extracted leak detection information to the above ground relay nodes via a low-frequency radio transceiver, and wherein the selection of the radio frequency takes into account the data rate, the antenna size, and the signal attenuation in multiple transmission media, including the in-pipe water, plastic pipe body, soil, and air.

5. The system of claim 1 wherein the relay nodes send the received leak detection information from the sensor nodes to the remote monitoring center using the high-frequency radio transceiver via an aboveground mobile network.

6. The system of claim 1 wherein the aboveground mobile network can be a cellular network, a WiFi network, a WiMAX network, or a satellite network.

7. The system of claim 1 wherein the remote monitoring center sends control commands to the relay nodes via an above ground mobile network, and wherein the relay nodes forward the control commands to the sensor nodes via low-frequency radio transceivers.

8. The system of claim 1 wherein the sensor nodes can also perform onboard robot control without control commands from the remote monitoring center.

9. The system of claim 1 for a seamless handover between two neighboring relay nodes initiated by a current active relay node comprising:
    the current active relay node detecting that an RSSI value decreases to a threshold, and/or the current active relay node detecting that the distance between the relay node and the sensor node increases to a threshold;
    waking a neighboring relay node up and putting it into active status.

10. The system of claim 1 for a seamless handover between two neighboring relay nodes initiated by the mobile sensor node comprising:
    the sensor node detecting that a RSSI value decreases to a threshold, and the sensor node detecting that the distance between the sensor node and the relay node increases to a threshold;
    the sensor node sending the relay node a handover request;
    the relay node relaying the handover request and beginning the handover process.

11. The system of claim 1 in which the relay nodes deal with a sensor node moving at a high speed comprising;
    the current relay node waking its neighboring relay node up and putting it into active status after detecting that a mobile sensor node has established a communication link with the current relay node;
    the remote monitoring center sending an updated duty cycle configuration to the relay nodes based on the sensor node's moving speed; and
    the relay nodes performing onboard duty cycle configuration based on the sensor node's moving speed.

12. The system of claim 1 wherein an active relay node decides a sensor node's global position and movement direction comprising:
    the relay node telling its global position by an installed GPS receiver;
    the relay node determining the pipeline distance between the relay node and the sensor node by evaluating the received RSSI values from the sensor node;
    the relay node determining the moving direction of the sensor node by checking the received readings from an accelerometer installed in the sensor node;
    the relay node determining more accurate position of the sensor node by combining the RSSI values, the last handover record, and the outputs of the accelerometer and the timer from the sensor node; and
    the relay node calculating the sensor node's global position by combining the relay node's global position and the sensor node's location relative to the relay node.

13. The system of claim 1 wherein a sensor node decides its global position comprising:
    the relay node sending its global position from an installed GPS receiver to the sensor node;
    the sensor node determining the pipeline distance between the sensor node and the relay node by evaluating the received RSSI values from the relay node;
    the sensor node determining its more accurate position by combining the received RSSI values, and the outputs of the accelerometer and the timer installed in the sensor node;
    the sensor node calculating its global position by combining the received relay node's global position and the sensor node's location relative to the relay node.

14. The system of claim 1 for reliably and timely delivering the leak detection information from a sensor node to the remoter monitoring center comprising:
    a sensor node performing real-time onboard data processing and extracting useful information;
    the sensor node packetizing the information with error detection and correction fields, sending out the resulting packets, and waiting for ACKs from the relay nodes;
    the sensor node retransmitting the packet immediately if failing to receive the corresponding ACK;
    the sensor node buffering the leak detection information in its memory if no communication link with any relay node is available, and sending out the information immediately whenever a communication link is available.

15. The system of claim 1 for time synchronization between an in-pipe sensor node and a relay node comprising:
a relay node retrieving a timestamp from the installed GPS receiver, and
the relay node periodically transmitting a time beacon to inform an in-pipe sensor node of the timestamp.

* * * * *